United States Patent [19]
Kolodin

[11] Patent Number: 5,808,823
[45] Date of Patent: Sep. 15, 1998

[54] METHOD AND CIRCUIT FOR REDUCING BATTERY POWER DRAIN IN A PORTABLE CASSETTE PLAYER

[76] Inventor: Louis Kolodin, 208 Rabbit Run Rd., Cherry Hill, N.J. 08003

[21] Appl. No.: 744,280

[22] Filed: Nov. 6, 1996

[51] Int. Cl.[6] .................................................. G11B 15/18
[52] U.S. Cl. ...................... 360/69; 360/73.06; 360/74.1
[58] Field of Search .................................. 360/32, 55, 62, 360/69, 71, 73.1, 73.04, 73.05, 73.06, 74.1

[56] References Cited

U.S. PATENT DOCUMENTS

| | | | |
|---|---|---|---|
| 3,492,585 | 1/1970 | Ludlam . | |
| 4,814,905 | 3/1989 | Hashimoto | 360/69 X |
| 4,933,795 | 6/1990 | Nigam | 360/121 |
| 4,984,103 | 1/1991 | Nigam | 360/74.1 |
| 5,214,543 | 5/1993 | Takao | 360/71 |
| 5,332,928 | 7/1994 | Johnson | 307/272.3 |
| 5,381,279 | 1/1995 | Dunn | 360/70 |
| 5,381,295 | 1/1995 | Rund et al. | 361/92 |
| 5,525,869 | 6/1996 | Wood | 315/169.2 |
| 5,530,911 | 6/1996 | Lerner et al. | 455/38.3 |

OTHER PUBLICATIONS

"Music To Go", *Consumer Reports Magazine*, pp. 776–783, Dec. 1995.

*Primary Examiner*—Andrew L. Sniezek
*Attorney, Agent, or Firm*—Plevy & Associates

[57] ABSTRACT

A technique is disclosed for reducing the power consumption of a battery powered cassette player typically including a motor. The technique includes sequentially operating the motor during a first interval (T1) and turning the motor off during a second interval (T2). In the first interval (T1) the motor is driven at a high speed rate. The first interval (T1) and the second interval (T2) are chosen so that the motor is turned off for a longer time period than it is operated to thereby conserve battery power. The technique further includes storing the information from the cassette tape player during the high speed first interval (T1). The stored information is then accessed during the intervals (T1,T2) in order to transfer the information to an output device which causes playback at a lower conventional rate. The technique is preferably implemented by utilizing a controller to perform these functions and an electronic memory device.

22 Claims, 4 Drawing Sheets

RUN TAPE AT FOUR TIMES
NORMAL PLAY SPEED

READ FROM TAPE,
CONVERT TO DIGITAL,
STORE IN DRAM

READ OUT OF DRAM,
MOVE TO OUTPUT

CONVERT TO ANALOG,
AMPLIFY, OUTPUT
TO HEADPHONES

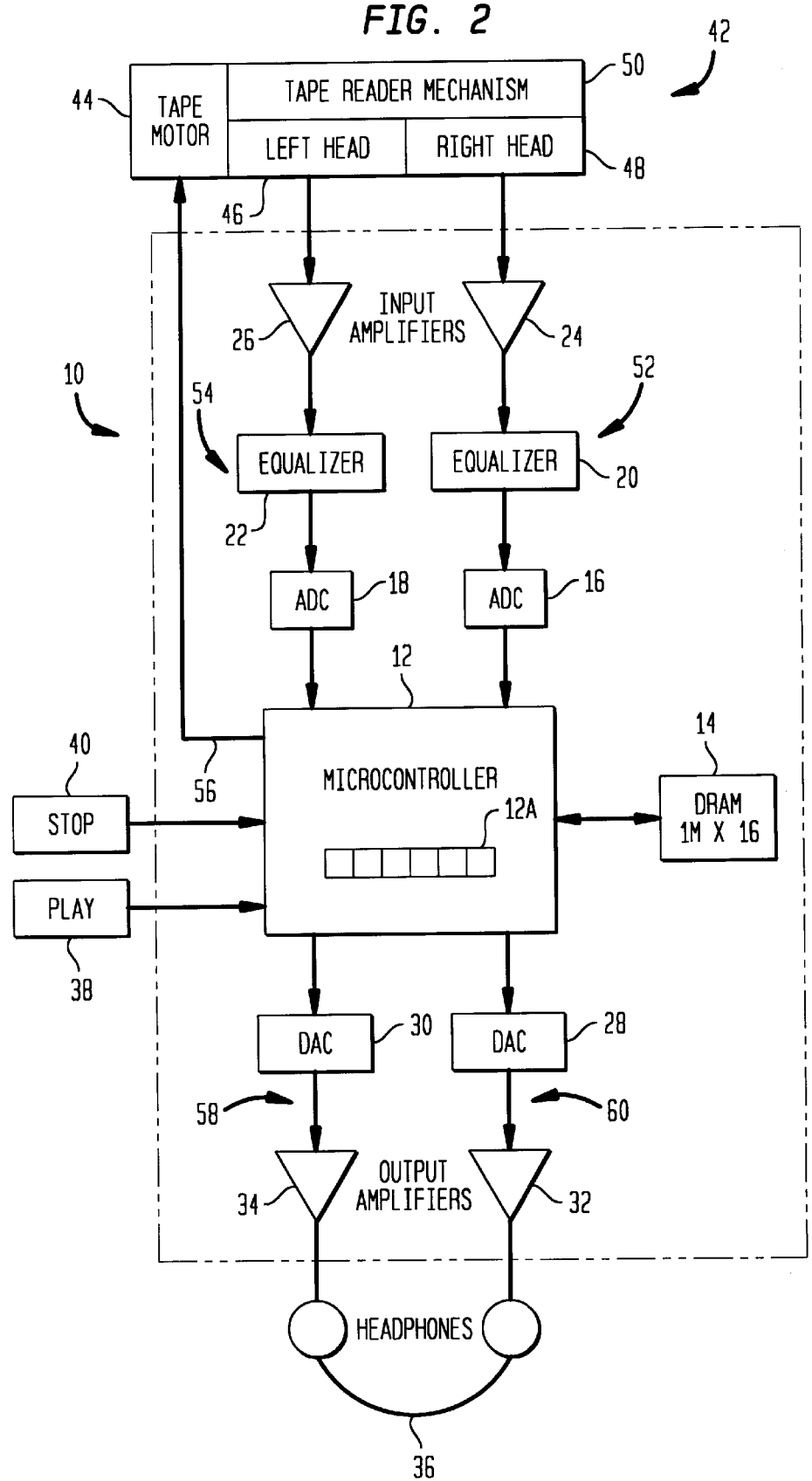

METHOD AND CIRCUIT FOR REDUCING BATTERY POWER DRAIN IN A PORTABLE CASSETTE PLAYER

BACKGROUND OF THE INVENTION

1. Field of the Invention

The present invention relates generally to cassette players, and more particularly to a technique for reducing battery power drain in portable cassette player devices.

2. Description of the Prior Art

Portable cassette players are devices which enable users to listen to pre-recorded music while engaging in various activities. An example of such a device is the cassette player/radio Walkabout. The Walkabout is the most popular and best selling personal stereo according to an article entitled MUSIC TO GO, Consumer Reports Magazine, pages 776–783, December 1995. The Walkabout is a smaller and lighter weight product, which does not have recording capabilities, and can be configured as either a cassette tape player/radio combination or simply as a cassette tape player.

A popular example of the Walkabout stereo is the Sony WALKMAN. Other manufactures of these devices include Aiwa, RCA, Magnavox, Emerson and GPX. An important feature of the Walkabout for people walking or jogging is its light weight. For example, the Sony Model WM-FX303 weighs less than eight ounces including a cassette tape and two "AA" batteries. Also such devices typically include clips which enables the cassette player to be hung from the belt or pocket of a user.

Walkabout stereos are powered either by utilizing AC adapters or batteries. However, the most popular method includes the use of batteries. Most Walkabouts typically utilize two 1.5 volt "AA" batteries in a series configuration. If "AA" alkaline batteries are utilized, the battery life for the cassette players range from eight to fifteen hours depending on the manufacturer, model and usage. For example, the operating instructions for the Sony WM-FX303 cassette tape player/radio combination lists an average battery life of eight hours for the tape player. While the Sony WM-EX122 operating instructions lists thirteen hours of battery life for the cassette tape player.

Extending the life of batteries utilized in Walkabout stereos would be a desirable feature. Obviously, this could be accomplished by utilizing four instead of just two "AA" batteries which would double the time between battery changes. However, the size and weight would be substantially increased making such a device less competitive. The battery cost per hour of "play" would decrease somewhat since running each battery at half the current drain more than doubles the total hours of use. However, the small gain in battery life and reduction in battery cost per hour of "play" is not substantial enough to offset the disadvantage of the added size and weight. Therefore, it would be desirable to extend the battery life without the use of additional batteries.

Extending the life of batteries utilized in Walkabout stereos could be accomplished by reducing the power drain on the batteries utilized. This would be desirable since it would reduce the frequency between battery changes and also significantly reduce the battery cost per hour of "play". Additionally, this would also contribute to the cleaning up of the environment since the number of old batteries to be disposed of would be reduced.

The prior art discloses a number of devices concerned with power reduction. Examples of such are disclosed by U.S. Pat. No. 4,984,103 to Nigam, entitled METHOD FOR READING\WRITING FOR A FLOPPY DISC DRIVE WITH BUFFER MEMORY, issued Jan. 8, 1991 and U.S. Pat. No. 5,530,911 to Lerner et al., entitled METHOD AND APPARATUS FOR BATTERY DRAIN REDUCTION BY ADJUSTING FOR DYNAMIC CHANGES OF RECEIVER WARM-UP TIME, issued Jun. 25, 1996. Nigam discloses a method for reading and writing from a floppy disc drive utilizing a buffer, while Lerner et al. discloses reducing battery drain in portable communication receivers by monitoring and then setting up an optimal warm-up time for that receiver. Even though each of the previously described prior art device may work well for its intended application, none are suitable for utilization in portable cassette players.

It is therefore, an object of the present invention, to provide a technique for reducing battery power drain which is readily adaptable to portable cassette player devices.

SUMMARY OF THE INVENTION

A technique is disclosed for reducing the power consumption of a battery powered cassette player typically including a motor. The technique includes sequentially operating the motor in a first interval (T1) and a second interval (T2). In the first interval (T1) the motor is driven at a high speed rate, while in the second interval (T2) the motor is turned off. The first interval (T1) and the second interval (T2) are chosen so that the motor is turned off for a majority of time thereby conserving the power of the battery. The technique further includes storing the information which was produced by the cassette player in the first interval (T1). Recalling the stored information during the intervals (T1,T2) in order to transfer the information to an output device in real time. The technique is preferably implemented by utilizing a control means to perform these functions and a storage means.

It is further disclosed that the control means provides an interrupt variable which is indicative of the amount of information which is transferred from the storage means to the output device. The control means utilizes the interrupt variable to rewind the tape within the tape player assembly to a position which corresponds to the amount information which was not transferred to the output device due to playback being interrupted.

BRIEF DESCRIPTION OF THE DRAWING

The above objects, further features and advantages of the present invention are described in detail below in conjunction with the drawings, of which:

FIG. 2 is a block diagram of a first embodiment of the portable cassette player according to the present invention;

DETAILED DESCRIPTION OF THE DRAWING

Figure 1A:
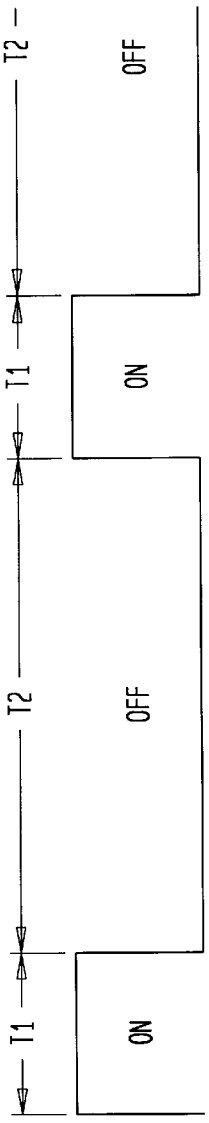
FIG. 1 includes waveform diagrams illustrating the method for reducing battery power drain in portable cassette players according to the present invention.
Figure 1B:
Figure 1C:
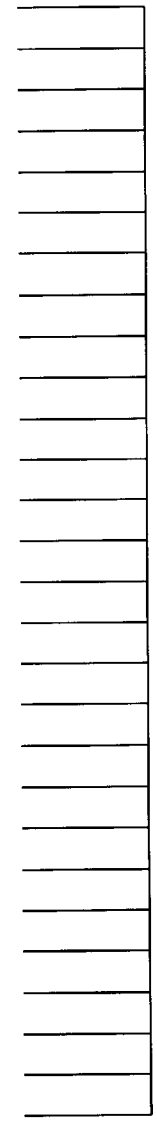
Figure 1D:

The present invention is directed to a technique for reducing the battery power drain in portable cassette player devices. The battery power drain is reduced by significantly decreasing the amount of current drawn by the cassette player motor when the device is in the "play" mode. This is accomplished by utilizing a storage device to store information read from a cassette tape at a substantially higher rate than real time and then to transfer this information from the storage device in real time to drive an output device such as headphones. This technique enables the cassette player motor to remain turned off for a majority of the time and thus reduces the amount of current drawn from the batteries.

Referring to FIG. 1, there is shown waveform diagrams that illustrate the method for reducing battery power drain in portable cassette players according to the present invention. In cassette player devices, the majority of the current drain is due to the motor utilized to drive the tape in the "play" mode. The amount of power consumed by these motors is approximately 75 to 80 percent of the total power consumed during the "play" mode.

In the present invention, the amount of time the tape motor is driven during the "play" is significantly reduced as illustrated by Waveform A. In Waveform A, the motor is driven at a substantially higher rate than the normal "play" speed of conventional cassette players for a time period of T1. The substantially higher rate is preferably four times the normal "play" speed. It is understood that normal tape speed is the speed that the information is recorded and therefore the playback speed has to be the same in order to obtain a true replica of the information (voice, music, etc) stored on the tape. Driving the tape motor at this rate causes signals or information to be read from the cassette tape at a rate which is four times the real time rate occurring at the normal "play" speed.

The signals being read from the tape are digitized and then stored in a storage device as illustrated by Waveform B. After time period T1, the tape motor is turned off. The tape motor is kept off for the entire time period T2 and thus does not draw any power or current.

During time periods T1 and T2, the digitized signals are read from the storage device as illustrated by Waveform C. The signals must be read from the storage device at a rate which would enable these signal to be transferred to an output device in real time and thus enable real time playback. These digitized signals are then converted to analog signals and amplified as illustrated by Waveform D. The signals of Waveform D are then utilized in real time to drive the output device such as headphones in order to provide audible information.

As is evident from FIG. 1, the time period T2 is approximately three times longer than T1. Thus, the bulk of the power savings is due to the motor being utilized only 25 percent of the time during the "play" mode. Since the tape motor consumes approximately 75 to 80 percent of the player power, the saving is considerable.

A further advantage of the method according to the present invention is that the batteries which supply the current that drives the tape motor has a much lower average current drain. This means that the milliampere hours available from each battery is increased, which further lowers the battery cost per hour of "play". Since the player motor is running at a higher rate, it draws moderately more power than at the normal "play" speed. However, since the motor is only turned on 25 percent of the time, this increase is negligible.

The previously described method according to the present invention reduces the power consumed in portable cassette players by a factor of at least two, which substantially increases the life of the batteries utilized in these devices. This method preferably utilizes a microcontroller to implement these functions and a Dynamic Random Access Memory (DRAM) as the storage device.

Referring to FIG. 2, a block diagram of the first embodiment of the portable cassette player according to the present invention is shown. The portion of the block diagram enclosed by the dotted box represents the circuit according to the present invention which implements the previously described method. The portion outside this box represents conventional elements of a cassette player which include headphones 36, a play button 38, a stop button 40 and a tape player assembly 42. The player assembly 42 typically includes a tape motor 44, a left head 46, a right head 48 and a tape reader mechanism 50.

The circuit 10 according to the present invention preferably utilizes a low power microcontroller 12 in order to control its various functions. Coupled to the microcontroller 12 is a storage device 14 which is preferably a DRAM. As can be seen, information can be passed in either direction between the controller 12 and DRAM 14. This enables the controller 12 to write or read data from the DRAM 14 at the appropriate time.

An important function of the controller 12 is to manage the power consumed by the DRAM 14. The DRAM 14 is kept in a low power "standby" state except for active periods when data is read in or out, or during refresh cycles (In DRAM devices, each word must be periodically read out and then read back in for each refresh cycle). Since the time involved in reading a word of data in or out from the DRAM 14 is very short, the DRAM is in the low power "standby" state approximately 98 percent of the time. The result of this is that the DRAM 14 as utilized in this circuit 10, requires a small amount of power. Utilizing a commercially available DRAM along with a DC to DC converter, results in the average power consumed by the DRAM to be about five milliwatts.

Further coupled to the controller 12 is the play button 38 and the stop button 40. The play button 38 is utilized to initialize the controller 12 in order to initiate the "play" mode when a user desires to play a cassette tape. While the stop button 40 de-activates the controller 12 in order to terminate the "play" mode.

Coupled between the controller 12 and tape player assembly 42 is a pair of input channels 52,54 for transferring signals or data therebetween. Each one of the input channels 52,54 is associated with one of the heads 46,48 of the player assembly 42 and includes respective input amplifiers 24,26, equalizers 20,22 and Analog to Digital Converters (ADC) 16,18 coupled in series between the controller 12 and tape player assembly 42. The amplifiers 24,26 amplify the signals received from the player assembly 42, while the equalizers 20,22 adjust the power spectrum of these signals. The ADCs 16,18 are utilized to convert the analog signals from the player assembly 42 into a digital format compatible with the controller 12.

The controller 12 further has an output 56 coupled to the tape motor 44. When activated, the controller 12 at this output 56 develops a signal to drive the tape motor 44. After the appropriate time period T1, this signal is removed and thus turns off the motor 44. Coupled between the controller 12 and headphones 36 is a pair of output channels 58,60 for transferring signals or data therebetween. Each of the output channels 58,60 include respective Digital to Analog Converters (DAC) 28,30 and output amplifiers 32,34 coupled in series between the controller 12 and headphones 36. The DACs convert the signals read out from the DRAM 14 by the controller 12 back into an analog form which the amplifiers 32,34 raise to a power level compatible with the headphones 36.

In order to initiate the "play" mode, the play button 38 is depressed which powers up the circuit 10 causing the controller 12 to be initialized. The controller 12 then places the DRAM 14 in the low power "standby" state and turns the tape motor 44 on for a time period T1 which is preferably 10 seconds. The motor 44 runs the tape past the left and right heads 46,48 at a rate of four times the standard tape speed, which causes signals or information to be read from the cassette tape at a rate which is four times greater than the real time rate of conventional tape player machines. The output of the read heads 46,48 are amplified, equalized and then converted to a digital format by the respective input channels 52,54 under the direction of the controller 12. The input channels 52,54 preferably sample and convert these analog signals into eight bit digital signals at a rate of 100,000 (100K) samples per second, which corresponds to one sample every ten microseconds.

The digitized signals from the two input channels 52,54 are then read into storage registers 12A included in the controller 12, where these two signals are combined preferably into a single sixteen bit word. After four words have been accumulated in the controller 12, these words are then transferred to the DRAM 14 which preferably occurs every forty microseconds. This transfer is accomplished by the controller 12 first signaling the DRAM 14 to transition from the "standby" state to an "active" state, which signals the DRAM 14 to read in data. Then the four sixteen bit words are transferred to the DRAM 14 in four successive write cycles of preferably 150 nanoseconds each. During the time period T1, 1000 k sixteen bit words are written into the DRAM 14 in ten seconds at a rate of 100 k words per second.

During time periods T1 & T2, the controller 12 reads words out of the DRAM 14 at a rate of preferably 25 k words per second which corresponds to one word every forty microseconds. Such a rate enables the controller 12 to transfer this information to the headphones 36 in real time in order to provide real time or undistorted playback. The controller 12 separates each word read out of the DRAM 14 into preferably two eight bit signals which are then simultaneously transferred to the respective DACs 28,30 of the output channels 58,60. The DACs 28,30 change these signals back into analog audio signals which are then amplified by the respective amplifiers 32,34. The amplified analog signals are then utilized in real time to drive the headphones 36. During T1 & T2, preferably 1000 k sixteen bit words are transferred from the DRAM 14 to the DACs 28,30 in forty seconds at 25 k samples per second. At the end of time period T2, the above process is repeated for another set of time periods T1 & T2.

During the "play" mode, the controller 12 records the amount of tape that has been read out to the DACs 32,34 for each set of T1 & T2 time periods. If the stop button 40 is depressed before the end of the tape, the controller 12 rewinds the tape equal to the portion of that tape the user has not heard yet during the T1 & T2 time periods.

For example, if the stop button 40 is depressed after being in T2 for 22 seconds, then eighty percent of the signals read during T1 have been heard by the user. This is based on forty seconds of signal being read from the tape during T1. Also during T1, 10 seconds of signal are simultaneously being delivered to the user which is followed by 22 seconds being delivered to the user during T2 before the stop button 40 was depressed. Thus, 32 seconds of signal was delivered to the user out of the total 40 seconds of signal read from the tape during T1, which corresponds to eighty percent. Based on this, the controller 12 must rewind the tape by an amount equal to twenty percent of T1. This rewinding is preferably accomplished at high speed in order to minimize the time required. After the rewinding is accomplished, the controller 12 turns the power off unless the user initiates another operation.

Figure 3:
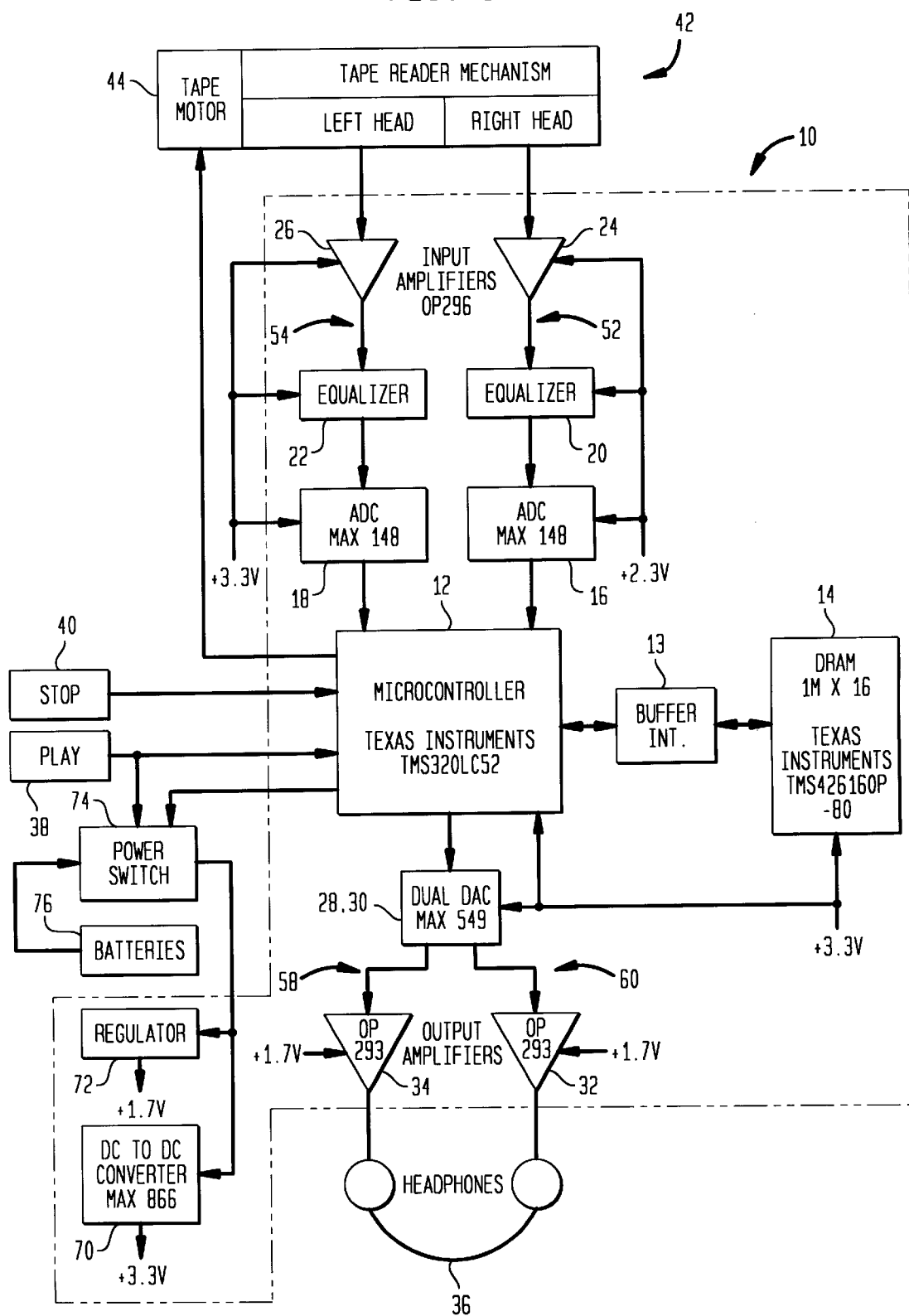
FIG. 3 is a more detailed block diagram of the first embodiment of portable cassette player according to the present invention.

Referring to FIG. 3, there is shown a more detailed block diagram of the first embodiment of portable cassette player according to the present invention. The controller 12 utilized is a Texas Instruments TMS320LC52 which is a low power microcontroller with a voltage supply requirement of 3.3 volts. This particular microcontroller draws an average of 5.2 mA from a 3.3 volt supply when it runs at five MIPS with the program activity required to control the system.

The DRAM 14 is a Texas Instruments TMS426160P-80 which is a sixteen Megabit high speed DRAM organized as 1,048,576 words of 16 bits each or 1M×16. This memory device 14 is powered from a supply voltage of 3.3 volts (3.0 to 3.6 volts) and has a standby current of only 0.2 mA. When this DRAM is run continually in the active state, it draws a maximum of 70 mA from the 3.3 volt supply. As utilized in the present invention, the DRAM 14 is in the "standby" state most of the time which enables the average current drain to be very low.

As previously described, The controller 12 places the DRAM 14 in the active state for only as long as it is writing in data, reading out data or for refresh. A buffer interface 13 is utilized between the controller 12 and DRAM 14 so that the speed and timing of the controller 12 is not required to match that of the DRAM 14 in order to obtain a minimum time in the active state for the DRAM 14. The controller 12 transfers data, address information and control signals to the buffer interface 13 via an I/O port of the controller 12, after which the buffer interface 13 controls the timing and the transfer of data to and from the DRAM 14. Timing logic in the buffer interface 13 places the DRAM 14 in the active state for 0.15 microseconds, which is enough time to complete a write, a read or a refresh cycle. The DRAM 14 is in the active state for 0.15 microseconds every 15.0 microseconds for refresh which is 1.00 percent of the time, during the intervals T1 and T2.

During the time period T1, four words are written into the DRAM every forty microseconds and one word is also read out every forty microseconds. The DRAM 14 is in the active state to write and read for 5×0.15 microseconds out of every forty microseconds which is 1.88 percent of the time. In addition, the DRAM 14 is also in the active state 1.00 percent of the time for refresh. Thus, the DRAM 14 is in the active state a total of 2.88 percent (1.88%+1.00%) of the time during T1. Since the supply current in the active state is 70 mA, the average current required during T1 is 2.02 mA (70 mA×0.0288) plus 0.2 mA for a total of 2.22 mA.

During the time period T2, one word is read out of the DRAM 14 every forty microseconds which means the DRAM is in the active state for 0.15 microseconds out of forty microseconds or 0.38 percent of the time. In addition, the DRAM 14 is also in the active state 1.00 percent of the time for refresh. Thus, the DRAM 14 is in the active state a total of 1.38 percent (0.386+1.00%) of the time during T2. The average current required during T2 is 0.97 mA (70 mA×0.0138) plus a standby current of 0.2 mA for a total 1.17 mA. Since T2 is three times as long as T1, the average current consumed by the DRAM 14 is 1.44 mA during the "Play" mode.

The input amplifiers 24,26 are embodied by an Analog Devices OP296 which is a dual operational amplifier device. The ADCs 16,18 are Maxim Max148 devices which are ten bit ADC devices that operate over a supply range of 2.7 to 5.25 volts. The supply current required for each ADC device is only 0.9 mA from 3.3 volts at a 100 ksps sampling rate. These devices further have a power down mode of less than ten microAmps which enables the current drain during T2 to be negligible. In actuality, the present invention only requires an eight bit ADC operating at 100 Ksps, but the Max148 was utilized since it was convenient and realistic data was readily available.

The DACs 28,30 are embodied by a Maxim MAX549 which is a dual eight bit DAC device. This device operates over a supply range of 2.5 to 5.5 volts and draws less than 0.3 mA at 3.3 volts. The Max549 also includes a sixteen bit register at the input and two eight bit data latches. The microcontroller 12 transfers the words previously stored in the DRAM 14 directly to the Dual DAC 28,30 where each word is separated into two eight bit signals. These two eight bit signals are then converted by this device 28,30 into analog signals for the left and right audio channels. The output amplifiers 32,34 are embodied by an Analog Devices OP293 which is a low power dual operational amplifier device that operates from a supply voltage as low as 1.7 volts.

As can be seen from FIG. 3, power is supplied to the circuit 10 by the batteries 76. The batteries 76 are coupled to the circuit 10 through a power switch 74. The output of the switch 74 is coupled to a regulator 72 and a DC to DC converter 70. The regulator is a 1.7 volt type which is utilized to supply power to the output amplifiers 32,34 and also to miscellaneous circuitry. The converter 70 is a Maxim MAX866 which is utilized to convert the battery voltage to 3.3 volts. This 3.3 volts is utilized to power the rest of the components included in the circuit 10 as shown. This converter 70 has an average efficiency of over eighty percent for the required current levels with an input voltage range of 1.5 to 3.0 volts.

The embodiment of the present invention shown in FIG. 3 utilizes commercially available low power and low voltage components. A comparison of the current drain of the present invention to other popular cassette players was conducted in order to access the amount of power actually saved. The comparison was made for the "play" mode since this is where most of the power is consumed. The motor current used in the present invention was the same as the motor current drain in each of the comparison cassette players except that it was increased by a factor to compensate for the higher speed during "play". The tape player according to the present invention consumed 39% of the current of the Sony WM-FX303, 42% of the Sony WM-EX122 and 47% of the Radio Shack Model No. SCP-22, which is an older model of a Radio Shack Cassette Player. The functions of the fast forward and rewind also consume current which reduces the overall current savings somewhat. However, the overall savings will still be at least two to one in comparison with these models.

Figure 4:
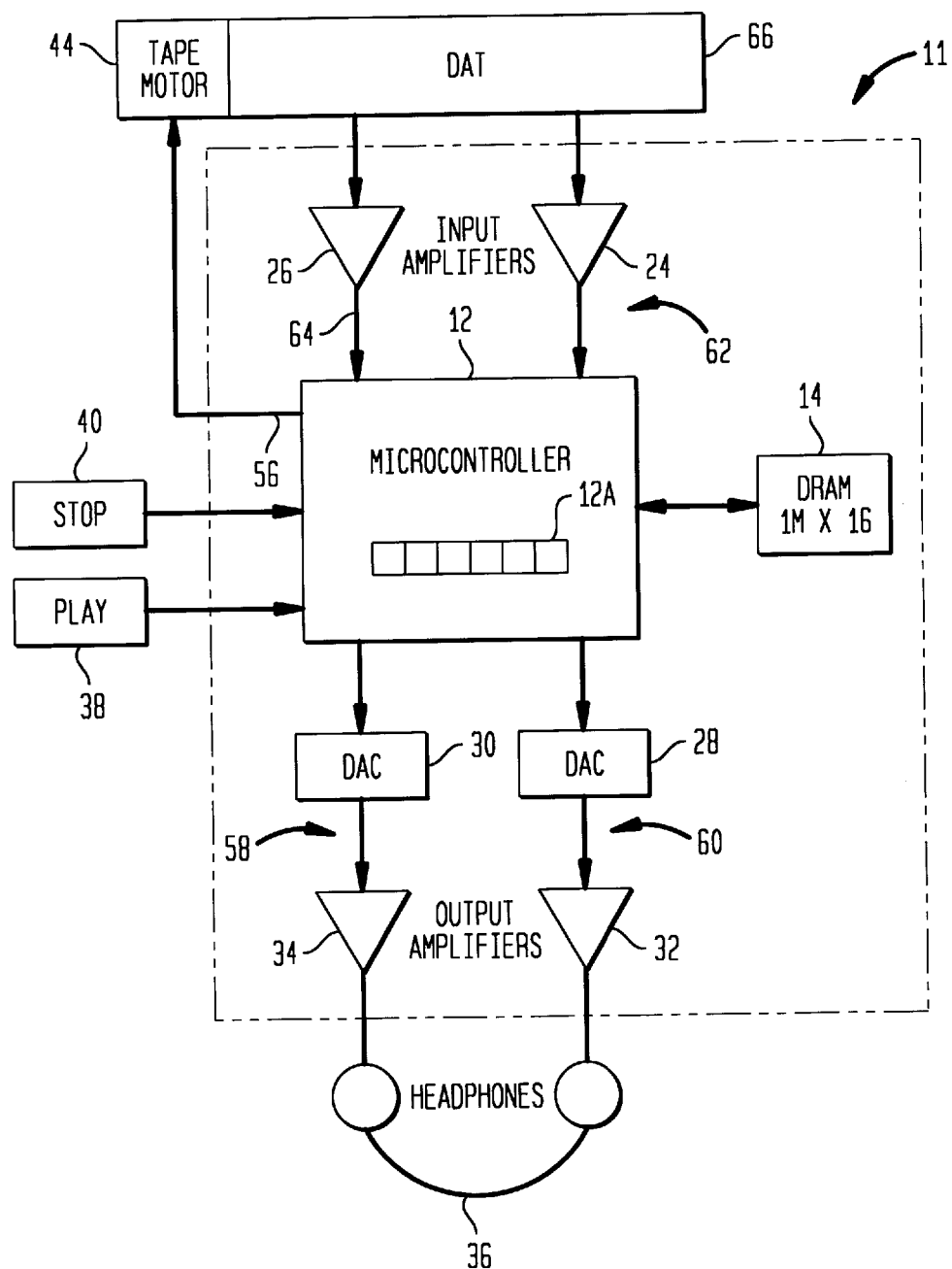
FIG. 4 is a block diagram of another embodiment of portable cassette player according to the present invention.

Referring to FIG. 4, a block diagram of another embodiment of portable cassette player according to the present invention is shown. This embodiment differs in that a Digital Audio Tape (DAT) assembly 66 is utilized instead of a conventional analog one. The DAT assembly 66 also includes a tape motor 44 which is utilized to drive the tape during the "play" mode. The use of the DAT assembly 66 is desirable since it enables the circuit 11 to be somewhat simplified. Since the signals received from the DAT 66 are already digital, the input channels 62,64 are no longer required to equalize these signals nor perform an analog to digital conversion. Thus, the input channels 62,64 in this embodiment only include amplifiers 24,26. This circuit 11 functions as the circuit described in conjunction with FIG. 2, except for the fact that the signals from the DAT 66 after being amplified are fed directly to the controller 12 without being equalized or converted. Therefore, the same reduction in battery current drain is achieved in this embodiment as in the previously described embodiment.

While the invention has been particularly shown and described with reference to preferred embodiments thereof, it will be understood by those skilled in the art that changes in form and details may be made therein without departing from the spirit and scope of the present invention.

What is claimed is:

1. A circuit for reducing the power consumption of a battery powered cassette player typically including a motor for driving the information storing tape, said information stored on said tape for playback at a given speed rate, comprising:

control means for sequentially operating the motor in a first interval (T1) and a second interval (T2), wherein in said first interval (T1) the motor is driven at a higher speed rate than said given speed rate and in said second interval (T2) the motor is turned off, said first interval (T1) and said second interval (T2) are chosen so that the motor is turned off for a selected period to conserve power of the battery;

storage means associated with said control means for storing information from said tape which was produced by the cassette player during said first interval (T1); and wherein said control means includes means for recalling said stored information during said intervals (T1,T2) in order to transfer said stored information to an output device for playback at said given speed rate.

2. The circuit of claim 1, which further includes a pair of input channels coupled to said control means for transferring information thereto, wherein each said input channel includes an input amplifier, an equalizer and an analog to digital converter coupled in series.

3. The circuit of claim 1, which further includes a pair of output channels coupled to said control means, wherein each said output channel includes an output amplifier and a digital to analog converter coupled in series.

4. The circuit of claim 1, wherein said storage means is a DRAM.

5. The circuit of claim 4, wherein said DRAM is kept in a "standby" state except for when information is being transferred to said DRAM, retrieved from said DRAM or during a refresh cycle of said DRAM.

6. The method of claim 1, wherein said high speed rate is four times the given speed rate.

7. The circuit of claim 1, wherein said control means transfers information from the cassette player to the storage means at a rate of 100K words per second.

8. The circuit of claim 1, wherein said control means recalls said information from said storage means at a rate of 25 K words per second.

9. The circuit of claim 1, wherein said control means provides an interrupt variable which is indicative of the amount of information which is transferred from said storage means to the output device.

10. The circuit of claim 9, wherein said control means utilizes said interrupt variable to rewind the tape within the cassette player to a position which corresponds to the amount of information which was not transferred to the output device due to the playback being interrupted.

11. A circuit for reducing the battery power drain of a tape cassette player typically including a tape player assembly including a motor for driving said tape at a given speed for normal playback of stored information, said circuit comprising:

a storage device; and a control means operative to enable said tape player assembly during a "play" mode comprising a first interval (T1) and a second interval (T2), said control means operative in said first interval (T1) to drive said tape motor at a higher speed than said given speed and including means to read stored information at a substantially higher rate and to transfer said information at said higher rate to said storage device, said control means in said second interval (T2) operative to turn off said tape motor, said control means further including means operative in said first and second intervals (T1,T2) to recall said stored information and to transfer said information to an output device for playback according to said given speed.

12. The circuit of claim 11, wherein said storage device is a DRAM.

13. The system of claim 12, wherein said DRAM is kept in a "standby" state except for when information is being transferred to said DRAM, retrieved from said DRAM or during a refresh cycle of said DRAM.

14. The circuit of claim 11, wherein said substantially higher rate is four times the normal speed of playback.

15. The circuit of claim 11, wherein said second interval (T2) is approximately three times as long as the first interval (T1).

16. The circuit of claim 11, wherein said control means transfers information from the tape player to the DRAM at a rate of 100K words per second.

17. The circuit of claim 11, wherein said control means recalls said information from said DRAM at a rate of 25 words per second.

18. The circuit of claim 11, wherein said control means provides an interrupt variable which is indicative of the amount of information which is transferred from said DRAM to the output device.

19. The circuit of claim 18, wherein said control means utilizes said interrupt variable to rewind the tape within the tape player assembly to a position which corresponds to the amount of information which was not transferred to the output device when said "play" mode is interrupted.

20. A method for reducing the power consumption of a battery powered cassette player typically including a motor for driving an information storing cassette tape at a given speed; to provide an accurate audio replica of said stored information, said method comprising the steps of:

sequentially operating the motor in a first interval (T1) and a second interval (T2), wherein said first interval (T1) the motor is driven at a high speed rate and in said second interval (T2) the motor is turned off, said first interval (T1) and said second interval (T2) are chosen so that the motor is turned off for a majority of time thereby conserving the power of the battery;

storing said tape information which was provided by the cassette player during said first interval (T1); and recalling said stored information in order to transfer said information to an output device for playback according to said given speed.

21. The method of claim 20, wherein said high speed rate is at least four times the "play speed" of a normal cassette tape motor.

22. The method of claim 20, wherein said second interval (T2) is approximately three times as long as the first interval (T1).

* * * * *